(No Model.)  2 Sheets—Sheet 1.
W. C. SHAFFER & J. L. POALK.
ELECTRIC SEWING MACHINE.
No. 306,288. Patented Oct. 7, 1884.
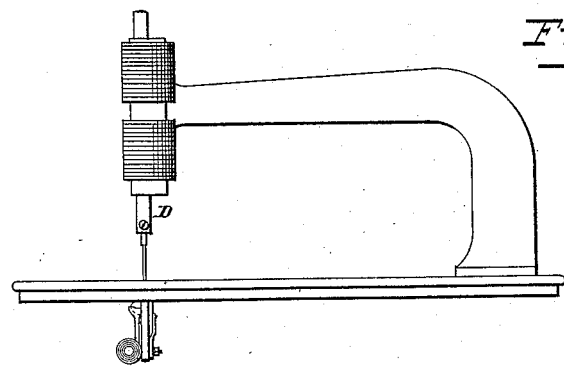
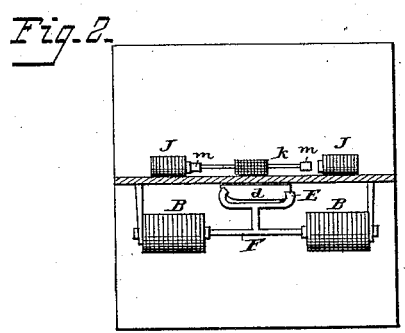
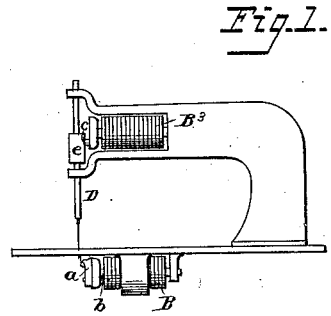
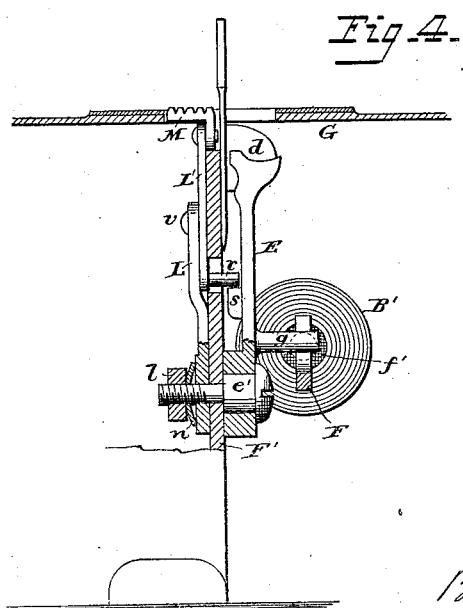
Attest:
Coul. A. Cooper,
Wm. G. Sayers.
Wm. C. Shaffer
J. L. Poalk
Inventors:
By Foster & Freeman
Attys

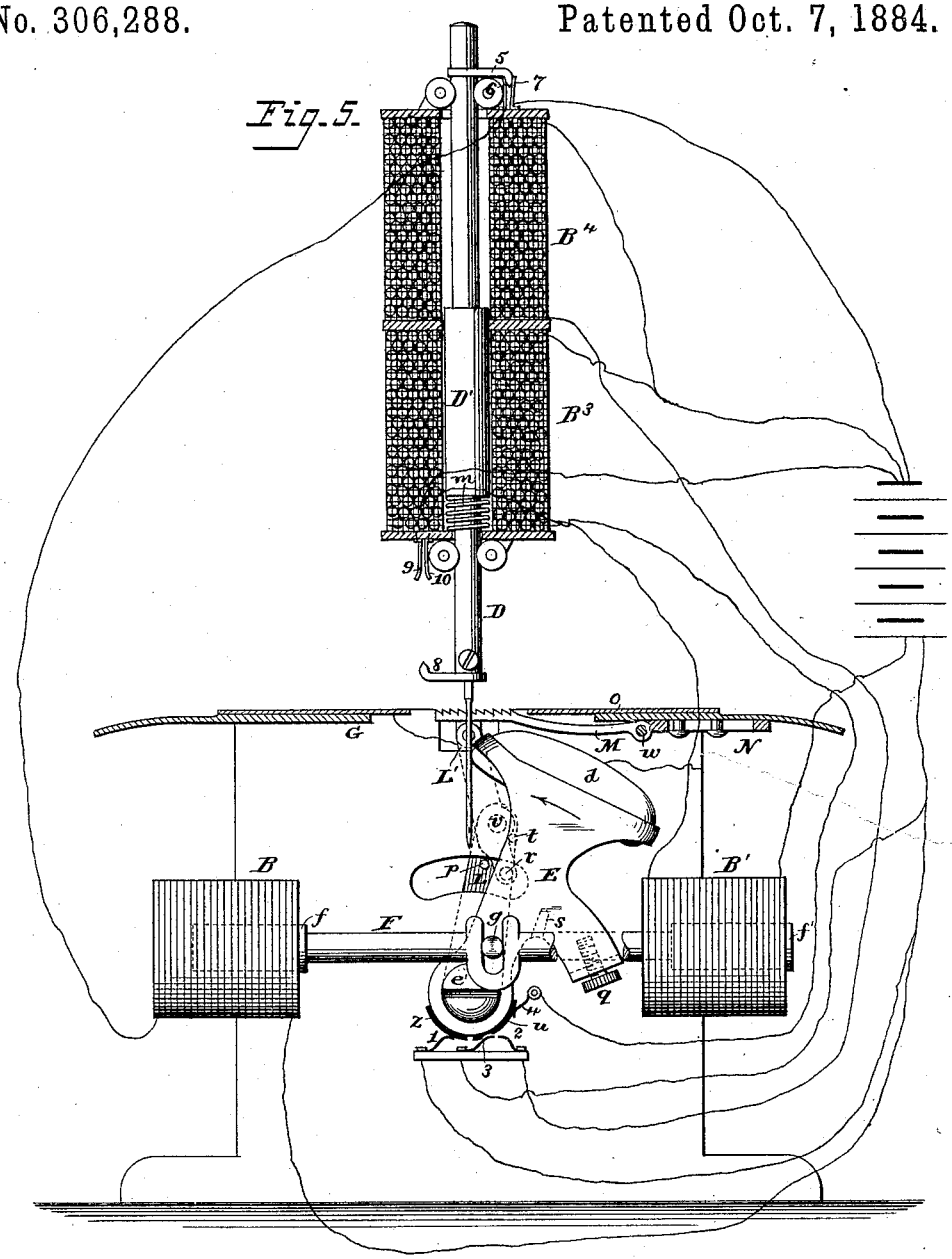

UNITED STATES PATENT OFFICE.

WILLIAM C. SHAFFER AND J. LANE POALK, OF PHILADELPHIA, PA.

ELECTRIC SEWING-MACHINE.

SPECIFICATION forming part of Letters Patent No. 306,288, dated October 7, 1884.

Application filed February 6, 1884. (No model.)

*To all whom it may concern:*

Be it known that we, WM. C. SHAFFER and J. LANE POALK, citizens of the United States, and residing at Philadelphia, in the county of Philadelphia and State of Pennsylvania, have invented certain new and useful Improvements in Electric Sewing-Machines, of which the following is a specification.

Our invention relates to sewing-machines; and it consists in means, hereinafter fully described, whereby the usual movements are imparted directly to the different parts by the action of electricity without the use of the usual multiplicity of gears, connecting-rods, and other appliances which result in friction and lost motion.

In the drawings, Figure 1 is a side elevation of a sewing-machine having a revolving hook, and illustrating our invention. Fig. 2 is a plan of the shuttle and feed-operating devices of a straight-race machine, showing our invention. Fig. 3 is a side elevation of another form of machine embodying our invention. Fig. 4 is an enlarged transverse section through the shuttle-plate of the machine shown in Fig. 3. Fig. 5 is a transverse sectional elevation of the machine shown in Fig. 3, looking from the end.

The general features of the invention consist in the use, in a sewing-machine, of one or more electromotors combined with the needle-bar, shuttle driver or feed, or with each of them, in such manner that such parts are directly operated from electric currents without the aid of shafts, gears, or intermediate devices.

It will be obvious that according to the character of the machine to be operated the operating motors will be differently constructed, connected, and arranged. Thus in a machine employing a revolving hook, $a$, Fig. 1, as in the Wheeler & Wilson and Willcox & Gibbs machines, the revolving armature of an electromotor, B, carries the hook upon its shaft $b$, and a crank-pin, $c$, upon the revolving armature of an electric motor, B$^2$, enters a slot in the cross-piece $e$ of the needle-bar D and reciprocates the latter. In such a machine the rotating shaft $b$ will move the feed-operating devices as in the machines above referred to.

In machines employing shuttles reciprocating in straight races or in straight paths the cradle E of the shuttle $d$, Fig. 2, is carried by an arm or rod, F, connected to the soft-iron cores of a solenoid-motor, B, consisting, preferably, of two coils, arranged in line, as shown.

A preferable construction where a reciprocating shuttle is used is shown in detail in Figs. 3, 4, and 5, where the shuttle $d$ is carried by a cradle at the upper end of a pivoted carrier, E, as in many machines in use, the shuttle sliding on a vertical face-plate, F', extending downward from the bed-plate G of the machine, and the carrier-arm E being pivoted by a pin, $e'$, to the side of said plate. The carrier is oscillated by the reciprocation of a bar, F, carrying two soft-iron cores, $f f'$, which extend into solenoids B B', the latter and the cores being relatively so arranged that a current through the coils of one solenoid will carry the bar F in one direction, an opposite movement being made when the current passes to the coils of the other solenoid. The connection between the bar F and the carrier-arm E is by means of a pin, $g$, which enters a slot in the bar, and by arranging this pin near the pivot $e'$ the requisite throw of the shuttle is secured with a comparatively small movement of the bar.

In Fig. 2 the feed-bar $k$ is shown as carrying two armatures, $m m$, and arranged to be reciprocated by the alternate action of two electro-magnets, J J. We prefer, however, to operate the feed from some part of the shuttle-moving appliances. An arrangement for effecting this result is shown in detail in Figs. 4 and 5, where the feed consists of two pivoted levers, L L', the lower swinging on the pin $e'$, and the upper connected to a feed-plate, M, pivoted at $w$ to a plate, N, arranged to slide beneath the work-plate G. A nut, $l$, on the pin $e'$ presses a split washer, $n$, against the lever L, to create a slight friction at this point, so that side pressure in the direction of the arrow, Fig. 5, upon the end of the lever L', which extends down below the pivot $v$, will tend first to bring the two levers into line and raise the claw of the feed-plate, and then, when the lever L' comes in contact with a stop, $p$, on the lever L, will carry both levers so as to slide the claw forward and move the work upon the work-plate o. This movement of the levers is effected by the contact of a set-screw, q, carried by the shuttle-carrier E, with a lug, r, on the end of the lever L'. As the carrier-arm E approaches its position to the left, the end of the set-screw q is brought against the lug r, and the feed is effected at the termination of the movement of the shuttle. As the arm moves to the right, a lug, s, thereon strikes the lug r and swings the lever L' on its pivot until it strikes a lug, t, on the lever L, thereby lowering the feed-claw, the levers L L' then being carried to the position shown in dotted lines, Fig. 5, when the lug s will pass from lug r, leaving the feed-levers in position while the movement of the arm E is continued. By this arrangement the same electric motor moves both the shuttle and feed.

It will be obvious that any other suitable feed device may be employed, and that any available connections between the motor and feed may be made use of.

The needle-bar carries the soft-iron core D' of a solenoid, which is divided into two sections, $B^3$ $B^4$, the action of one of which is to raise the core and the other to draw it down, thereby imparting the desired vertical reciprocating motion. It is necessary to carry the needle to its lowest position, then raise it slightly to form the side loop, then hold it momentarily while the shuttle enters the loop, and then to carry it upward. To secure these movements a spring, m, is so arranged as to be struck by a shoulder or projection on the bar D as the needle approaches the limit of its lower motion, the spring being thereby compressed, and the current through the coil is then cut off so that the spring can act to lift the bar and its needle slightly after they reach the lowest point, the parts remaining in this position until the upper solenoid receives a current, when they will be raised until the needle passes from the cloth.

Any suitable switch arrangement may be employed to throw the currents in proper order through the solenoids. Thus when the parts are in the position shown in Fig. 5 the solenoids $B^3$ $B^4$ of the needle-bar are neutral, but the solenoid B' of the shuttle mechanism is excited and the shuttle is being carried to the left. When the shuttle reaches its position to the left, the upper solenoid, $B^4$, of the needle-bar is excited and the needle is raised and remains lifted until the solenoid B' of the shuttle device is excited, when the shuttle will be carried to the right, after which the lower solenoid, $B^3$, of the needle-arm will be excited and the needle will descend.

It will be noticed that there is a time when the needle-arm is absolutely at rest and when the shuttle-arm is practically so. If all parts were to cease their movements at one time, it would be impossible without manipulation to continue the operation of the machine. We therefore arrange the switches or connections so that the moving part will always be the means of exciting the solenoids of the part which is at rest. One of the many different arrangements that may be used for effecting this is shown, the wire connections being shown, for distinctness of illustration, as carried directly between the parts; but it will of course be understood that they are in practice concealed in the frame of the machine. The hub of the shuttle-arm carries a plate, z, which, when in contact with two spring-fingers, 1 2, completes the circuit, including the upper needle-bar solenoid $B^4$, the needle being thus raised after the shuttle is carried through the loop, and being held in suspension until the shuttle-arm moves back, when another plate, u, is brought into contact with two other spring-fingers, 3 4, and completes the circuit, including the solenoid $B^3$, when the needle is carried downward. As it is not desirable for the current to act to keep the needle in its lowest position, in order that the spring m may lift it slightly, the plate u is notched, so that the finger 3 shall have only a momentary contact therewith, sufficient only to insure the descent of the needle, the current being then broken and the spring lifting the needle slightly to the position shown. When the needle reaches its lowest position, a projection, 5, on the upper end of the bar enters between two fingers, 6 7, and completes the circuit, including the solenoid B, when the shuttle will be thrown to the left, and when the needle-bar rises a projection, 8, on the lower end enters between fingers 9 10 and completes the circuit, including the solenoid B', and the shuttle is thrown to the right. By this means absolute precision in the relations of the movements of the parts is secured, as one cannot move until the other has attained the proper position. It will be apparent, however, that where a fly-wheel is connected to the parts, which may be done to secure less abrupt action, the switch devices can be carried by any revolving or continuously-moving part of the machine, and all the parts may remain at rest at one time, if necessary.

It will be evident that polarized or soft-iron cores may be used with the solenoids, the latter being correspondingly connected to insure proper action. It will also be evident that the operating-currents may be derived from any suitable generator.

Without limiting ourselves to the construction and arrangement of parts described, we claim—

1. The combination, with a sewing-machine, of two or more electric motors, each connected to operate directly one of the working parts of the machine, and means to operate circuit-breakers to insure movements of such part in unison with the others and the continued movement of the machine, as set forth.

2. The combination, with the different working parts of a sewing-machine, of electric motors, each connected to operate directly one of the parts, and devices operated from moving parts of the machine for causing the various motors to operate in unison and the machine to continue its motion, substantially as described.

3. A sewing-machine provided with one or more electric motors connected directly with the parts to be operated, and switches and operating appliances connected to be operated by parts moved by the motors, whereby the movement of each part is caused in proper time with that of the other parts, and is positively arrested and resumed, substantially as set forth.

4. The combination, with the working parts of a sewing-machine, of an electric motor arranged to operate the needle-bar, an electric motor arranged to operate the shuttle, and switches and connections operated by moving parts of the machine, whereby the parts are moved in proper relation to each other, substantially as described.

5. The combination of the electric motor actuating directly the needle-bar in both directions, and the electric motor actuating directly the shuttle in both directions, and connections whereby the movement of one of the parts is the means of completing the circuit, including the motor actuating the other part, substantially as set forth.

6. The combination, with the needle-bar, of an electric motor for operating the same directly, and means for breaking the circuit during the time the needle-bar is to remain at rest and during the movement of the shuttle, substantially as described.

7. The combination, with the needle-bar and electric motor, of devices for breaking the motor-circuit, and means for lifting the bar to a limited extent when the current is broken, substantially as described.

8. The combination, with the needle-bar of a sewing-machine, of an electro-magnet arranged and operating to directly reciprocate the same, and means whereby the movement is varied to form the loop at the side of the needle, substantially as described.

9. The combination, with the needle-bar, shuttle or looper, and feed device of a sewing-machine, of actuating-magnets arranged to impart direct movements to said parts and connections, and circuit-breakers operated by the moving parts, whereby the movement of one part is the means of making or breaking the circuits of the magnet controlling the other part, and the alternate action of the parts and continued movement of the machine is automatically effected, substantially as described.

In testimony whereof we have signed our names to this specification in the presence of two subscribing witnesses.

WILLIAM C. SHAFFER.
J. LANE POALK.

Witnesses:
J. T. KICHNER,
CHAS. SWAYNE.